United States Patent
Weldemariam et al.

(10) Patent No.: US 11,120,552 B2
(45) Date of Patent: Sep. 14, 2021

(54) CROP GRADING VIA DEEP LEARNING

(71) Applicant: International Business Machines Corporation, Armonk, NY (US)

(72) Inventors: Komminist Weldemariam, Ottawa (CA); Kala Fleming, Nairobi (KE); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/288,087

(22) Filed: Feb. 27, 2019

(65) Prior Publication Data
US 2020/0273172 A1  Aug. 27, 2020

(51) Int. Cl.
| | |
|---|---|
| G06T 7/00 | (2017.01) |
| G06N 3/08 | (2006.01) |
| G06N 3/04 | (2006.01) |
| A01B 79/00 | (2006.01) |
| G06T 7/70 | (2017.01) |

(52) U.S. Cl.
CPC .......... *G06T 7/0014* (2013.01); *A01B 79/005* (2013.01); *G06N 3/04* (2013.01); *G06N 3/08* (2013.01); *G06T 7/0016* (2013.01); *G06T 7/70* (2017.01); *G06T 2207/10036* (2013.01); *G06T 2207/20081* (2013.01); *G06T 2207/20084* (2013.01); *G06T 2207/30188* (2013.01)

(58) Field of Classification Search
CPC ....... G06T 7/0014; G06T 7/0016; G06T 7/70; G06T 2207/20084; G06T 2207/20081; G06T 2207/30188; G06T 2207/10036; G06T 2207/10024; G06T 2207/10032; G06T 2207/30252; G06T 7/0012; G06N 3/08; G06N 3/04; A01B 79/005; A01D 91/04

See application file for complete search history.

(56) References Cited

U.S. PATENT DOCUMENTS

| | | |
|---|---|---|
| 7,715,013 B2 | 5/2010 | Glaser |
| 8,617,286 B2 | 12/2013 | Rizzo |
| 9,053,528 B2 | 6/2015 | Fryshman |

(Continued)

FOREIGN PATENT DOCUMENTS

WO   2014100856 A1   7/2014

OTHER PUBLICATIONS

Yogesh Singh Rawat et al., Context-Based Photography Learning using Crowdsourced Images and Social Media, MM'14, Nov. 3-7, 2014, Orlando, Florida, pp. 217-220.

(Continued)

*Primary Examiner* — Aaron W Carter
(74) *Attorney, Agent, or Firm* — Shimon Benjamin; Otterstedt, Wallace & Kammer, LLP

(57) ABSTRACT

Methods and systems for crop grading and crop management. One or more images of crops are obtained and one or more crop related features are at least one of identified or extracted from the one or more images. A crop health status is determined based on the one or more crop related features, an environmental context, a growth stage of the crop, and a farm cohort by using a computerized deep learning system to perform an automated growth stage analysis. One or more actions are at least one of recommended, triggered, and performed.

13 Claims, 6 Drawing Sheets

(56) References Cited

U.S. PATENT DOCUMENTS

| | | | |
|---|---|---|---|
| 9,131,644 | B2 | 9/2015 | Osborne |
| 9,527,115 | B2 | 12/2016 | Stager |
| 9,638,678 | B2 | 5/2017 | Shriver |
| 9,959,507 | B2 | 5/2018 | Mathur |
| 10,438,302 | B2* | 10/2019 | Bedoya ............... G06Q 50/02 |
| 10,713,542 | B2* | 7/2020 | Gui ...................... G06T 3/40 |
| 10,772,269 | B2* | 9/2020 | Fleming ............. A01G 25/167 |
| 2008/0304711 | A1 | 12/2008 | Scharf |
| 2010/0136603 | A1* | 6/2010 | Han ................... G01N 33/1866 435/29 |
| 2012/0237083 | A1* | 9/2012 | Lange .................. G06F 16/29 382/103 |
| 2013/0011011 | A1 | 1/2013 | Fryshman |
| 2013/0028487 | A1 | 1/2013 | Stager |
| 2014/0012732 | A1* | 1/2014 | Lindores .............. G06Q 50/02 705/37 |
| 2016/0223506 | A1* | 8/2016 | Shriver ............. G06K 9/00657 |
| 2017/0032258 | A1* | 2/2017 | Miresmailli ........... A01G 13/06 |
| 2017/0161560 | A1 | 6/2017 | Itzhaky |
| 2017/0358106 | A1* | 12/2017 | Yoshimura ............ G01J 3/51 |
| 2018/0059691 | A1* | 3/2018 | Fleming ............... G06Q 50/02 |
| 2018/0082362 | A1* | 3/2018 | Greenberg ............ G05B 15/02 |
| 2018/0137579 | A1 | 5/2018 | Park |
| 2018/0164762 | A1 | 6/2018 | Mewes |
| 2018/0211156 | A1* | 7/2018 | Guan .................. G06Q 10/06 |
| 2018/0330245 | A1* | 11/2018 | Cohen .................. G06N 3/08 |
| 2018/0330247 | A1* | 11/2018 | Cohen ............... G06K 9/00657 |
| 2018/0330486 | A1* | 11/2018 | Cohen ................ G06T 7/0004 |
| 2019/0050948 | A1* | 2/2019 | Perry .................. G06Q 10/04 |
| 2019/0228223 | A1* | 7/2019 | McKenna ........... G06T 7/0002 |
| 2020/0117897 | A1* | 4/2020 | Froloff .............. G06K 9/00771 |
| 2020/0124581 | A1* | 4/2020 | Gui .................... G06K 9/6218 |
| 2020/0134485 | A1* | 4/2020 | Sood .................. A01B 79/005 |
| 2020/0196535 | A1* | 6/2020 | Dagondon ............. A01G 7/00 |
| 2020/0273172 | A1* | 8/2020 | Weldemariam ......... G06N 3/08 |

OTHER PUBLICATIONS

Xie C, Shao Y, Li X, He Y. Detection of early blight and late blight diseases on tomato leaves using hyperspectral imaging. Scientific reports. Nov. 17, 2015;5:16564.

Missouri Botanical Garden, A Visual Guide: Tomato Foliage, Stem & Root Problems, pp. 1-7, downloaded from www.mobot.org Oct. 21, 2019.

Choi KH, Lee G, Han YJ, Bunn JM. Tomato maturity evaluation using color image analysis. Transactions of the ASAE. 1995;38(1):171-6.

Peter Mell and Timothy Grance, The NIST Definition of Cloud Computing, Special Publication 800-145, National Institute of Standards and Technology, Gaithersburg, MD 20899-8930, Sep. 2011, cover, i-iii, 1-3.

\* cited by examiner

FIG. 3A

TOMATO BLUEPRINT

| | ESTABLISHMENT | VEGETATIVE GROWTH | FLOWERING | FRUIT SET | MATURITY |
|---|---|---|---|---|---|
| Q | ARE TOBACCO WHITE FLIES VISIBLE? | ARE LEAVES DROPPING MORE THAN USUAL? | DO YOU SEE OLIVE-GREEN, PESTS WITH LARGE TRIANGULAR SPOTS ON THEIR BACK? | DO GREEN FRUITS HAVE A SMALL WATER-SOAKED SPOT? | DOES THE UPPER LEAF SURFACE HAVE PALE GREEN OR YELLOWISH AREAS WITH UNDEFINED MARGINS? |
| A | USE COVER CROPS OR MULCH TO REDUCE DAMAGE. | YOU MIGHT HAVE A LEAF MINER INFESTATION. TUTA ABSOLUTA. TURN OVER THE SOIL AROUND THE PLANT. | THIS MIGHT BE A FRUIT BORER PEST. SPRAY NEEM EXTRACTS OR USE PYRETHRIN. | THIS IS NOT A GOOD SIGN. YOU MIGHT HAVE BACTERIAL SPOT DISEASE. YOU WILL LOSE TOMATOES. | YOU MIGHT HAVE LEAF MOLD. PLEASE REMOVE ANYTHING THAT MIGHT BE SHADING THE PLANT. |
| INPUTS | WATER: 15% OF TOTAL<br>TEMP: 69.8–80.6°F<br>HERBICIDE: 50% OF TOTAL<br>FERTILIZER: 50% OF TOTAL | WATER: 15% OF TOTAL<br>TEMP: 64.4–77°F<br>HERBICIDE: 50% OF TOTAL<br>FERTILIZER: 10% OF TOTAL | WATER: 20% OF TOTAL<br>TEMP: 65–80°F<br>HERBICIDE: --<br>FERTILIZER: 10% OF TOTAL | WATER: 20% OF TOTAL<br>TEMP: 65–80°F<br>HERBICIDE: --<br>FERTILIZER: 20% OF TOTAL | WATER: 20% OF TOTAL<br>TEMP: 65–80°F<br>HERBICIDE: --<br>FERTILIZER: 10% OF TOTAL |

390

CROP GRADING VIA DEEP LEARNING

BACKGROUND

The present invention relates to the electrical, electronic, and computer arts, and more specifically, to techniques for crop grading and crop management.

Crop quality assessments are important for managing risks during the growing season and enabling price premiums after harvest. Across some developing regions of the world, quality evaluations are manual, often inconsistent, and much of the specialty equipment required to consistently collect and analyze images, such as photographic images, in the field are inaccessible to the average small-scale farmer. As a result, productivity suffers, and farmers fetch lower prices in the market and might have trouble getting loans in the future. In addition, there is an absence of uniform guidelines for farmers to use on how to grow crops.

SUMMARY

Principles of the invention provide techniques for crop grading via deep learning. In one aspect, an exemplary method includes the operations of obtaining one or more images of crops; at least one of identifying or extracting one or more crop related features from the one or more images; determining a crop health status based on the one or more crop related features, an environmental context, a growth stage of the crop, and a farm cohort by using a computerized deep learning system to perform an automated growth stage analysis; and at least one of recommending, triggering, and performing one or more actions.

In one aspect, an exemplary system for determining or predicting a grade of a crop comprises a memory; and at least one processor, coupled to the memory, and operative to obtain a report regarding a first grade of a crop from a user; determine a second grade of the crop from an expert system using deep learning to analyze weather conditions and one or more images of the crop; determine an optimal time to harvest the crop; and assess an impact of the crop grading on a predicted market value of the crop.

In one aspect, an exemplary non-transitory computer readable medium comprises computer executable instructions which when executed by a computer cause the computer to perform the method of obtaining one or more images of crops; at least one of identifying or extracting one or more crop related features from the one or more images; determining a crop health status based on the one or more crop related features, an environmental context, a growth stage of the crop, and a farm cohort using deep learning to perform an automated growth stage analysis; and at least one of recommending, triggering, and performing one or more actions.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

establishing a cohort history of crop health and quality by translating photographic image evaluation results to crop grading at each growth stage of the crop;

using visual analytics to determine the crop health status of the plant in an effort to anticipate quality;

modeling a crop blueprint over the growth stage of a crop by relying on a machine-mediated network (e.g., a machine-mediated human evaluation network using a set of so-called "Mechanical Turks") to semi-automate the process of expanding the set of classes in a visual classifier;

using databases of farms with similar characteristics, contextual information, or both to determine the crop grading;

predicting the optimal time to harvest the crop based on established cohort history of crop health and quality; and analyzing the market demand and price for the crops.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3A is a graph of an example crop blueprint for a tomato crop, in accordance with an example embodiment;

DETAILED DESCRIPTION

Figure 1:
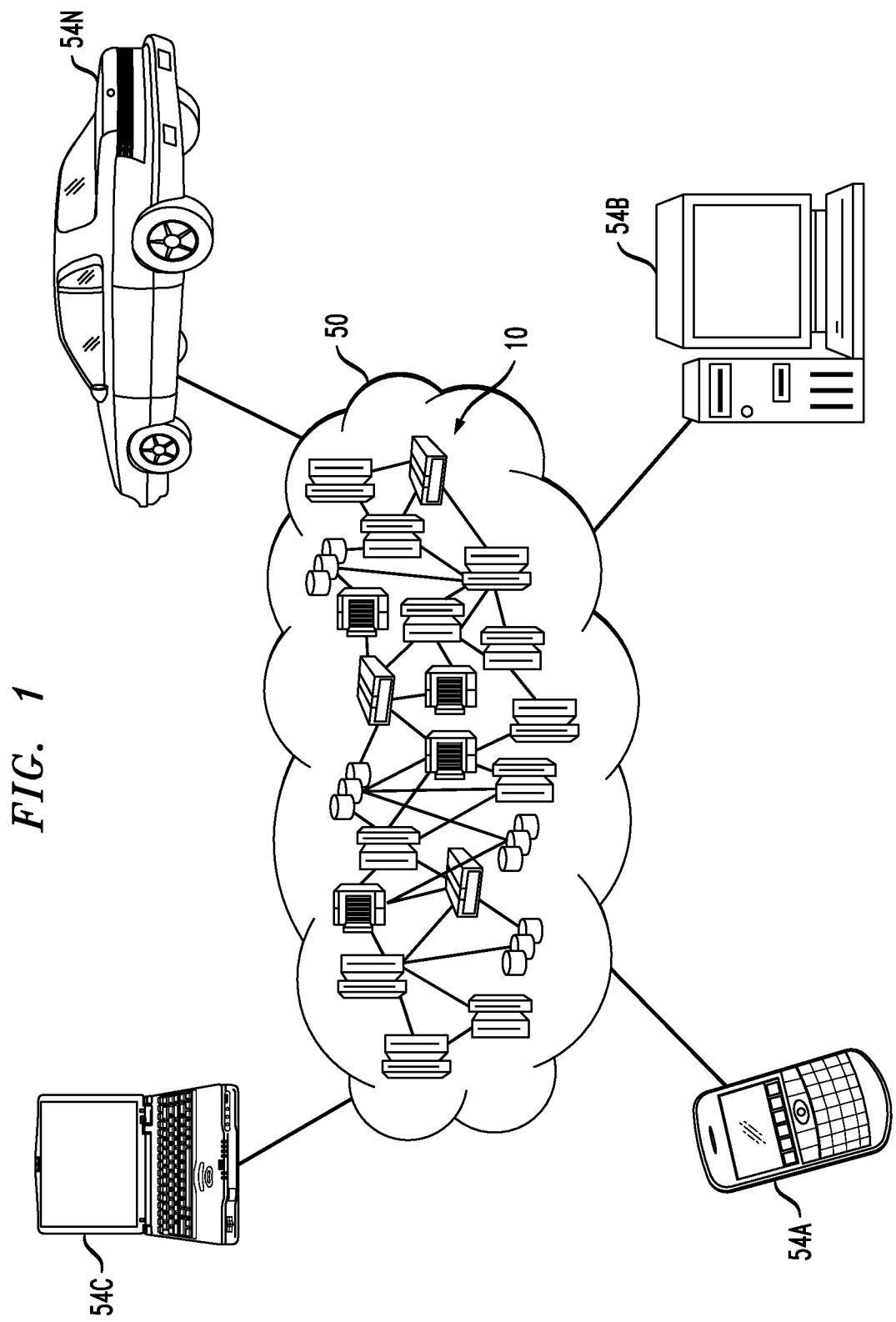
FIG. 1 depicts a cloud computing environment according to an embodiment of the present invention.

Generally, systems and methods for crop grading via deep learning are disclosed. A health status of a crop is determined, and a sequencing and timing of the most suitable set of options for the crop is determined based on the health status. Weather, plant status, soil conditions, visual evidence, reports from experts, and farmer profile are some of the criteria used to determine the health status of crops, and the sequencing and timing of the most suitable set of options for the crop. The assessment of the crop health status is based on an analysis of crop features, crop stress levels, crop images (such as photographic images), environmental context (such as weather), crop knowledge graph models, and the like. In one example embodiment, a plurality of humans with interconnection facilitated by a communication network submit reports to the system regarding the observed crop health and crop status, initial confidence levels (as described more fully below), and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
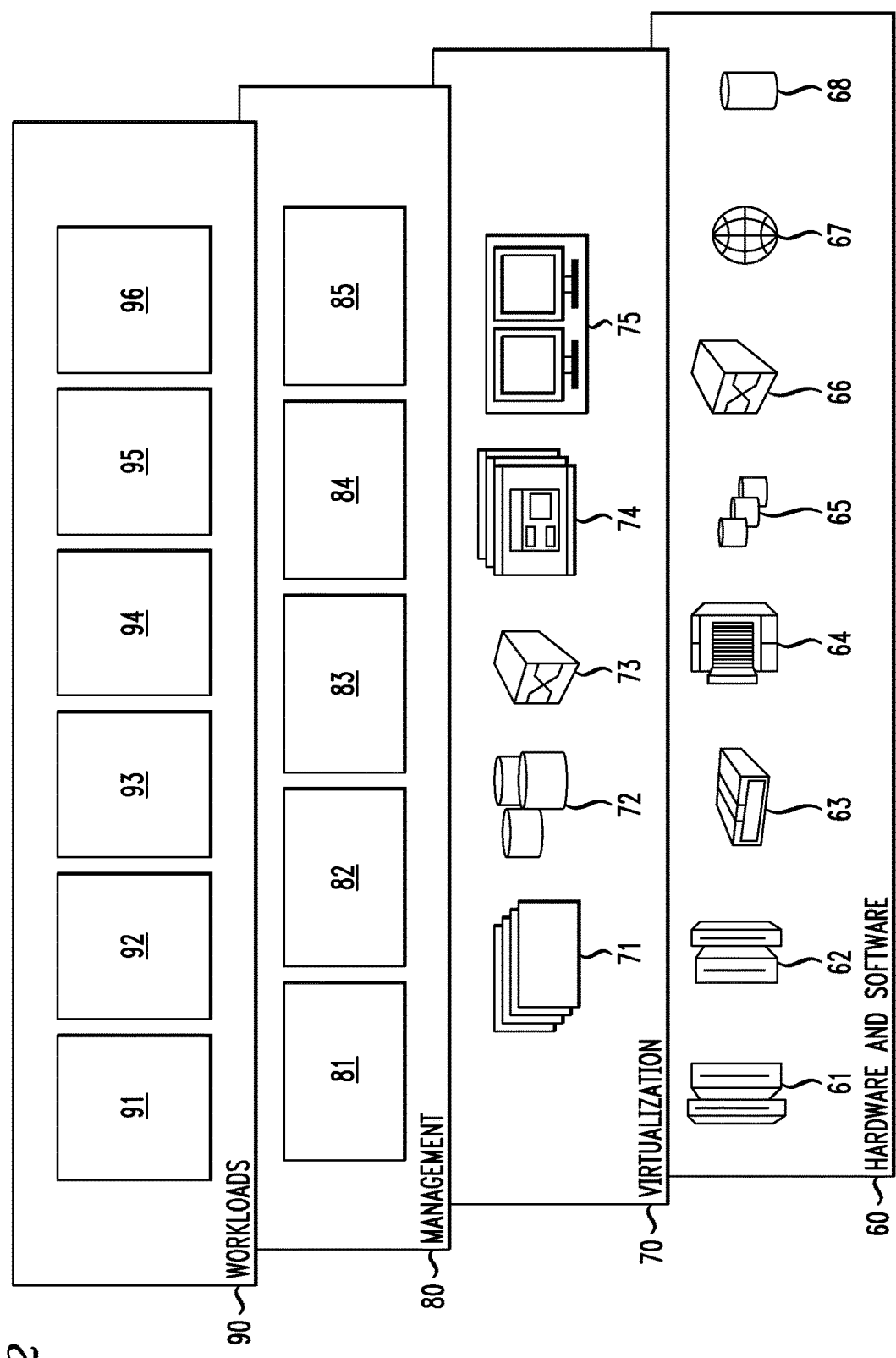
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 providing crop grading via deep learning; in some instances, human mediated crop grading and crop management via human observations and deep learning 96. In one or more embodiments, the module 96 learns through implementation of a neural network that is supervised by human evaluators using a set of so-called "Mechanical Turks." Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

As described above, a health status of a crop is determined, and a sequencing and timing of the most suitable set of options for the crop is determined based on the health status. Weather, plant status, soil conditions, visual evidence, reports from experts and other observers, and a farmer profile are some of the criteria used to determine the health status of the crops, and the sequencing and timing of the most suitable set of options for the crop. The assessment of the crop health status is based on an analysis of crop features, crop stress levels, photographic images of the crop, environmental context (such as weather), crop knowledge graph models, and the like.

One example embodiment employs one or more photographic images of the crop, and includes identifying or extracting one or more features from the images (such as a size, a shape, a color, visual spots, virus/insects, and the like), determining the crop health status using the features and environmental context (such as the weather, a location of the crop, and the like), a farm cohort (such as planting history of the farm, a water uptake history of the farm over the last N days, past farmer activities, and the like), assessing or predicting the quality Q of the crops within a threshold risk R (such as Q is less than the expected quality Q(s) for the growth stages S), and, based on the estimation or prediction, the system generates or updates both a crop blueprint and alerts for members of a human network.

In one example embodiment, crop quality cohorts (CC) are established over the growth stage of a crop. The crop quality cohorts may be augmented by a machine-mediated human evaluation network to assess crop quality and health over time. More than one evaluator confirms the quality rating based on their understanding of weather, soil fertility, farm management practices associated with a photographic image, and the like. This rating is used to inform the farmer of critical production risks, to support farmer differentiation and rating at harvest, and the like.

Using the tomato as an example, the USDA Grade standard for tomatoes describes requirements for size, color, firmness, and damage (see Choi, K. H. G. H, et al. "*Tomato maturity evaluation using color image analysis.*" *Transactions of the ASAE* 38.1 (1995): 171-176.). These features are typically assessed at harvest via visual assessment or using laboratory analysis. These methods, however, have often proved to be time consuming, inefficient, and destructive. Also, highly trained and qualified technicians are required for such detection techniques. In practice, in some locations, buyers from small farms make a visual assessment of the quality and determine the fruit's suitability for the markets they serve. Local tomatoes sold on the road side are often small and malformed.

Continuing with the above tomato example, most consumers measure the quality of a tomato primarily by three factors: physical appearance (such as color, size, shape, defects, decay, and the like), firmness, and flavor. Fruit quality is significantly affected by the stage of ripeness of the tomato when removed from the plant, the number of times the tomato is handled, the storage temperature and storage time, and the like. The longer the tomato remains on the plant, the more flavorful the fruit is. The less amount of handling, the smaller incidence of bruising (some have suggested that flavor is also reduced with increased handling). It is frequently observed that tomato fruit that is not ripened on the plant does not have the same flavor and aroma as fruit that has developed its red color (or final fruit color) on the plant.

It is also known that the growing conditions for tomatoes can influence the best time of harvesting and the quality of fruit produced at harvest. For example, deficit irrigation (where only, for example, 50 to 60 percent of the crop's water requirements are met) leads to smaller but redder fruit. On the other end of the spectrum, rain shelters are often used to protect open field tomatoes since heavy downpours also reduce yield and increase the potential for disease. Many fungal diseases, for example, reside in the soil or in bits of plant material left over from previous years. When it rains, fungal spores splash up onto the lower leaves of a tomato plant, infecting them. The next time it rains, the spores from the infected leaves splash up onto the next set of leaves. Unchecked, the infection may spread all the way to the top of the plant.

Early blight (Alternariasolani) and late blight (Phytophthorainfestans) are the two common fungal diseases of tomato plants. When these fungi infect tomato leaves in a favorable environmental condition, symptoms can rapidly spread and cover the entire leaf blade. Identifying diseased leaves as early as possible is one of the most cost effective approaches to protect the tomato plant and its future harvest. Xie et al demonstrated the potential for early blight detection using hyperspectral imaging via a high quality camera (see Chuanqi Xie et al. *Detection of early blight and late blight diseases on tomato leaves using hyperspectral imaging, Sci Rep.* 2015; 5: 16564. Published online 2015 Nov. 17). Reflectance of healthy samples was higher than that of infected ones in the near-infrared region (750-1000 nm), which is caused by the collapse of leaf cell structure as the disease spreads. The mean spectral reflectance curves of healthy, early blight and late blight diseased leaves illustrate the potential for image analytic techniques to provide early warning of diseases or other environmental conditions that may impact the crop grade at harvest. In one example embodiment, image evaluation results are analyzed and translated to a measure of their impact on crop grading at each growth stage of the crop in order to establish a history of crop health and quality. This may be accomplished using hyperspectral imaging, normal photographic imaging, and the like. In one example embodiment, high resolution, conventional photographic images of the crop (such as leaves and tomatoes on the plant) can be analyzed to assess insect infestation, tomato size, symmetry, and other attributes.

The use of water uptake patterns to determine crop health status in an effort to predict productivity is known. In one example embodiment, visual analytics are used to determine the crop health status of the plant in an effort to anticipate and improve quality. For example, plant leaves typically get infected first with a fungal disease, and then the disease spreads to the plant fruit. Visual analytics of photographic images of the crop can be used to detect the disease in its early stages. In one example embodiment, the images are taken at multiple locations and at multiple magnifications from, for example, an aeronautical drone. The images are then compared to images taken at the same location (as determined, for example, by the Global Positioning System) and magnification to those obtained at an earlier time.

In one example embodiment, the assessment of crop cohort (CC) may include an automated growth stage analysis by applying one or more machine learning methods such as deep learning and neural net with some confidence level (L) (that may use context information, e.g., weather). In case the confidence level L is less than a certain threshold, the system may video stream photographic images of the crop to a remote professional for expert evaluation. The initial confidence level can be determined by the human expert. Over time, as historical data is accumulated, the system may automatically configure L based on historical values. The remote professional might be an expert in growing or harvesting the crop such as an agricultural professor, a so-called "Mechanical Turk," an individual skilled in crop cohort assessment, and the like.

In one example embodiment, an image, such as a photographic image, of a crop is captured and submitted to a crop analytics system. Photographic images may be obtained using a mobile phone/device, a fixed camera/sensor, a sensing device mounted on a farm vehicle, a flying drone, a satellite, and the like (image source generally depicted as app 304). Photographic images may be submitted at regular time intervals, at regular intervals of the crop growth stage, in response to an event (such as a specified rate of change of the crop color), or in a continuous manner. Some embodiments take photographic images at non-regular intervals, triggered by events such as the rate of change of crop color. For example, there may be no need to take photographs every third day when the leave color is not changing. When the leaves or crops are changing color rapidly (e.g., from green-to-brown), then it may be an early indication of disease, insect infestation, and the like, and photographs should be taken more closely together (e.g., once every four to six hours) to ensure the efficacy of pesticide application, changes in watering patterns, and the like. Once the rate of color change has stabilized, then the photographic images can be taken at the previous rate (e.g., at regular intervals).

The photographic images may contain various degrees of magnification so that the small scale (e.g., insects on leaves) or large scale (e.g., the entire farm) can be captured and analyzed. The growth stages of a crop vary from crop to crop type. For example, for a tomato, the stages are: establishment, vegetative growth, flowering, fruit set, and maturity.

The identification or extraction of features from photographic images of the crop is based on one or more machine learning methods that use visual analytics, deep learning, and the like. Example features include, but are not limited to, a shape of the crop, a color of the crop, a size of the crop, visual spots on the crop, a virus of the crop, worms or insects infesting the crop, and the like. In one example embodiment, a feature analyzer detects and extracts a shape of the crop, identifies the rate of change of crop color, detects one or more spots on the crop and their patterns, and the like. In one example embodiment, a health/quality assessor identifies, assesses, and characterizes the nature of the insect or virus infecting the crop at various locations within the farm. In one example embodiment, the health/quality assessor determines a pattern of worms or insects and identifies how they are spreading to other plants in the farm over time via a time series of photographic images. This data could be used to alert the farmer to pick the healthy plants early or to spray pesticides on the healthy crops to avoid the damage that would be caused by the spread of the worms or insects to the healthy plants.

As described above, the assessment of the crop health status is based on the analysis of crop features, crop stress levels, environmental context (such as weather), crop knowledge graph models, reports by observers, and the like.

FIG. 3A is a graph of an example crop blueprint 390 for a tomato crop, in accordance with an example embodiment. Each column of the crop blueprint 390 corresponds to a growth stage of the crop. In one example embodiment, the growth stages are establishment, vegetative growth, flowering, fruit set, and maturity. The first row of each column corresponds to a question regarding, for example, a state of the crop. If the question is answered in the affirmative, the second row of each column provides detailed information, such as a diagnosis of a health issue and a recommended action. The third row of each column provides recommended inputs, such as recommended environmental conditions. The fourth row of each column provides an illustration of the crop at the corresponding growth stage.

The assessment of the health of the crop can use a decision tree induction technique to generate new classification rules based on an analysis of crop features obtained by monitoring crops and their properties, where each rule set is given as a classifier. Models generated from decision trees are stored in a graph-based knowledge representation for easy interpretation as it also uses ontology to model contextual information. For example, mature red tomatoes will retain a high quality for approximately four to seven days if stored at 90 to 95 percent relative humidity and at a temperature of 46° F. to 50° F. Fruit borers (insects), however, cause up to 70 percent of fruit loss. Therefore, this may indicate that, when the crop is infested with fruit borers, either the fruit should be picked on time or early to avoid the loss of the fruit. If the health or quality of the crop drops from an expected level L for the current stage of crop growth, various actions are recommended, triggered, performed, or any combination thereof by the system. Examples of actions include: recommending that the farmer pick the crops early, if possible; recommending to spray pesticides or other chemicals; recommending the capture of photographic images at a finer detail to see, for example, if the insect infestation is expanding; recommending to switch to a different crop the following growing season; and the like. One or more embodiments further include carrying out the recommended actions, such as applying pesticides and the like. For example alerts, messages, and the like can be sent over network adaptor 20 discussed below to trigger performance of actions.

In one example embodiment, a grade of a crop is determined or predicted. The grade may be determined or predicted, for example, just prior to harvesting. The determination of crop grading can be performed by a human expert (such as an agronomist), via collaboration with human observers, for example using a team of so-called "Mechanical Turks," via reports from crop/farm aggregators, by an expert system, and the like. In one example embodiment, the system provides a video stream (or a series of photographs) to a remote professional for evaluation of the crop. In one example embodiment, the crop grading also assesses the impact of the grading on the predicted market value of the crop, taking into consideration the local market conditions (supply and demand) in locations where the crops are expected to be sold.

In one example embodiment, the method of determining or predicting the crop grading and determining or predicting the optimal time to harvest the crop utilizes learning algorithms and databases of neighboring farms or farms having similar characteristics, similar contextual information, and the like. The similarity may be based on a farmer reliability, water point reliability, and the like.

In one example embodiment, the optimal time to pick the crop is determined based on a time-series evaluation, a prediction of crop grade from video or photographic images using deep learning and visual analytics, human inspection, economic conditions, and the like. For example, the picking of the crop may be delayed if prices are rising or expedited if prices are falling. The knowledge base (represented using ontology and a searchable graph) may be used to provide ground evidence given the crop growth state. In one example embodiment, the knowledge base hierarchically characterizes and organizes a crop based on crop type, size, calyx characteristics, color development, fruit ripening, and the like. In one example embodiment, the time-series evaluation is based on a collection of historical observations of farm data, identifying the nature of the growth pattern represented by the sequence of observations, and then predicting the optimal time to pick the crop in a given time period. The analysis further separates the temporal aspects of the observed farm/crop data in terms of trends, seasonal variation (e.g., weather pattern, disease pattern, and the like), and assessments of irregular cycles (e.g., short-term market fluctuations and the like). Various known time series techniques can be used, from simple statistical models (for time-series forecasting) to more complex models or approaches such as Generalized Autoregressive Conditional Heteroskedasticity (GARCH), Bayesian-based models, variants of neural network models (such as Neural Networks Autoregression (NNAR)), variants of deep learning (such as Recurrent Neural Network (RNN)), Long Short-Term Memory (LSTM), and the like. In one example embodiment, a time series of photographs might show that the rate of change of the color or size of a crop of tomatoes is slowing down, indicating that the crop is near maturation.

In one example embodiment, low magnification photographic images of an entire crop field are processed and a crop analyzer applies various metadata extraction tools and analytics algorithms. The metadata extraction tools extract or detect, for example, an identity of the part or location of the farm where the photographic image was taken (e.g., "southwest corner"). The analytics algorithms learn, for example, the meaning of the rate of change of crop color based on historical images and based on the data from the crop knowledge graph.

In one example embodiment, the photographic images of the crops are used to assess the health of the entire crop. For example, the photographic images of the crops can be analyzed to recognize a soil condition in one corner of the field that is poor and that is causing a slower maturing rate (than an average maturing rate) at that position on the farm. In one example embodiment, the crop analysis further incorporates soil pH variation or evolution (such as, between a current time Tc and an aggregated past time Tp), farmer history, farm history, and the like. In another example embodiment, the crop analysis incorporates soil moisture variation in different portions of the entire crop.

In one example embodiment, an interactive user interface is provided such that a user (such as the owner or manager of the farm) may visually observe the farm conditions and submit visual and other observations (such as a leaf color changing to yellow, particular insects on crop leaves, context information (such as a time of the day and a type/name or characteristic of the insect), and the like) to the crop analysis system.

In one example embodiment, actions are recommended, triggered, performed, or any combination thereof using a stored knowledge base and historic events related to the crop. Example actions include, but are not limited to, applying chemicals (such as pesticides, herbicides, insecticides, fungicides, and the like), obtaining and ingesting additional photographic images of the crops, additional watering or reductions of the watering, recommending to harvest the crop (such as based on market readiness information and a weather forecast), and the like. The actions also include sending a signal to an irrigation system, sending a notification to a human expert (such as an agronomist, extension field officer, so-called "Mechanical Turks" and the like), sending an alert message (via SMS, voice over IP messaging, multi-purpose messaging, social media platforms, and the like). In one example embodiment, a recommendation may be issued recommending a delay in the ripening of a crop based, for example, on market conditions and other contextual information. For example, if the local market is flooded with tomatoes and prices are low, the ripening may be delayed by, for example, depriving the tomatoes of water for a few days until market conditions improve; harvesting the tomatoes and placing them in cold storage; and the like.

Figure 3B:
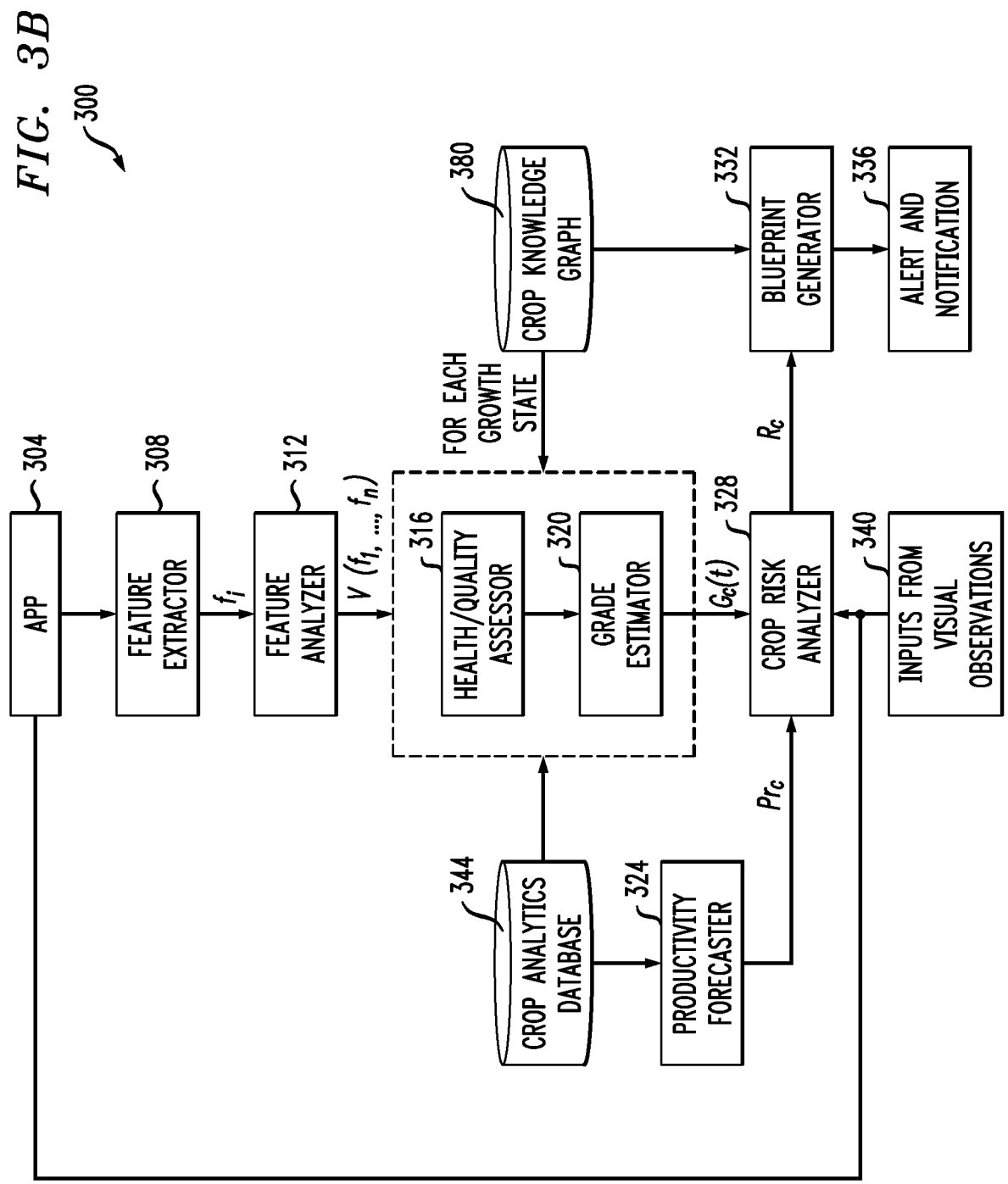
FIG. 3B is an illustration of an example system for analyzing and managing crops, in accordance with an example embodiment.

FIG. 3B is an illustration of an example system 300 for analyzing and managing crops, in accordance with an example embodiment. In one example embodiment, the system 300 includes one or more applications 304, a feature extractor 308, a feature analyzer 312, a health/quality assessor 316, a grade estimator 320, a crop knowledge graph 380, a productivity forecaster 324, a crop risk analyzer 328, a blueprint generator 332, an alert and notification unit 336, and a crop analytics database 344. The crop analytics database 344 stores, for example, a crop database, historical crop yield data, disease history, farm and farmer models, and the like.

The feature extractor 308 obtains photographic or video images of crops and identifies or extracts crop related features from the images, such as crop size, crop color, visual spots, virus/insects, and the like, as described more fully above. For example, the low magnification images may show that the crops are maturing at different rates within different locations within the farm. Alternatively, a high magnification image might show an insect infestation and enable the identity of the insects to be determined.

The feature analyzer 312 analyzes the features extracted by the feature extractor 308. The feature analyzer 312 searches for the appropriate or optimal feature combination for determining crop health status. In one example embodiment, the feature analyzer 312 is implemented using a genetic algorithm by constructing a maximum entropy based classifier.

The health/quality assessor 316 determines a crop health status using the crop related features, environmental context, a farm cohort, the crop knowledge graph 380, weather, plant status, soil conditions, visual evidence, reports from experts, the nature of an insect or virus infecting a crop at various locations within a farm, crop stress levels, and the like and generates or updates a crop blueprint. As described above, the assessment of the health of the crop can use a decision tree induction technique to generate new classification rules based on an analysis of the crop features, where each rule set is given as a classifier. In one example embodiment, the health/quality assessor 316 assesses or predicts the quality Q of the crops within a threshold risk R (such as Q is less than the expected quality Q(s) for the growth stages S). In one example embodiment, the health/quality assessor 316 recommends, triggers, or performs actions (or any combination thereof), as described more fully above. Some embodiments utilize, for example, a recurrent neural network (RNN) including Long short-term memory (LSTM) units.

The grade estimator 320 estimates the grade of a crop based, for example, on the size of the crop, color of the crop, spots on the crop, the crop knowledge graph 380, and the like. In one example embodiment, the crop grading also assesses the impact of the grading on the predicted market value of the crop, taking into consideration the local market conditions (supply and demand) of where the crops are expected to be sold. As described above, in one example embodiment, the method of determining or predicting the crop grading and determining or predicting the optimal time to harvest the crop utilizes learning algorithms and databases of neighboring farms or farms having similar characteristics, similar contextual information, and the like. The similarity may be based on a farmer reliability, water point reliability, and the like.

The productivity forecaster 324 estimates the productivity for a crop based on the crop knowledge graph 380, water uptake patterns, social characteristics, crop type, visual analytics (to, for example, detect disease and insect infestation), weather, and the like. In one example embodiment, the crop risk analyzer 328 is based on training at least one machine learning model (e.g., from a Decision Tree and Bayesian network modeling to deep neural network algorithms) using features extracted from the crop knowledge graph, water uptake patterns, social characteristics, crop type, visual analytics, weather, and the like. The crop risk analyzer 328 orders the features by value by running a scoring function S that measures feature-relevance affecting the current and predicted crop risk, and then selecting (feature selection) the k highest ranked features according to S (a high score is indicative of a valuable relevant feature). Various methods that are known in the art for ranking criteria, such as the Pearson correlation coefficient algorithm, can be used. The generated risk score value can be high, medium, or low compared to a preconfigured threshold value. The preconfigured threshold value can be learned from historically best performing threshold values. In one or more embodiments, the output of the Crop Risk Analyzer 328 is used by the productivity forecaster.

The alert and notification unit 336 issues recommendations to users based on results generated by the system 300. As described above, the recommendations may suggest that a farmer pick crops early, may warn of the detection of blight or insects infesting the crops and therefore recommend spraying a pesticide, may suggest a rotation to another crop in the following growing season, and the like. In one example embodiment, the alert and notification unit 336 obtains the results generated by the health/quality assessor 316, the grade estimator 320, the productivity forecaster 324, the crop risk analyzer 328, farm details (including the farmer details from a farm profile/blueprint and previous recommendations issued to the farmer), and the like and generates one or more recommendations and a set of actions based on the obtained results. In one example embodiment, the alert and notification unit 336 is heuristic or rule based, implements statistical or machine learning algorithms (such as time-aware collaborative filtering techniques and neural network based algorithms), and the like. The generated recommendations along with recommended actions can be further optimized based on context information, such as weather, farmer specific conditions, and the like.

The blueprint generator 332 generates blueprints for various crops, such as the crop blueprint 390 for a tomato crop. In one example embodiment, the blueprint is generated or inferred based on data from a crop database.

The applications 304 include, for example, an interactive user interface that provides the ability for a user to submit features and farm conditions that are visually or otherwise observed. For example, a human observer may submit visual observations 340 regarding crop health via one of the applications 304, such as the interactive user interface. The interactive user interface provides the ability for a user to receive reports and recommendations, such as crop health status, crop grade, actions/recommendations, and the like. In one example embodiment, a crop blueprint is presented via the interactive user interface. The interactive user interface may obtain the content of the crop blueprints and the like from a cloud-based server. In one example embodiment, the cloud-based server provides information using Hyper-text Markup Language (HTML).

Figure 4:
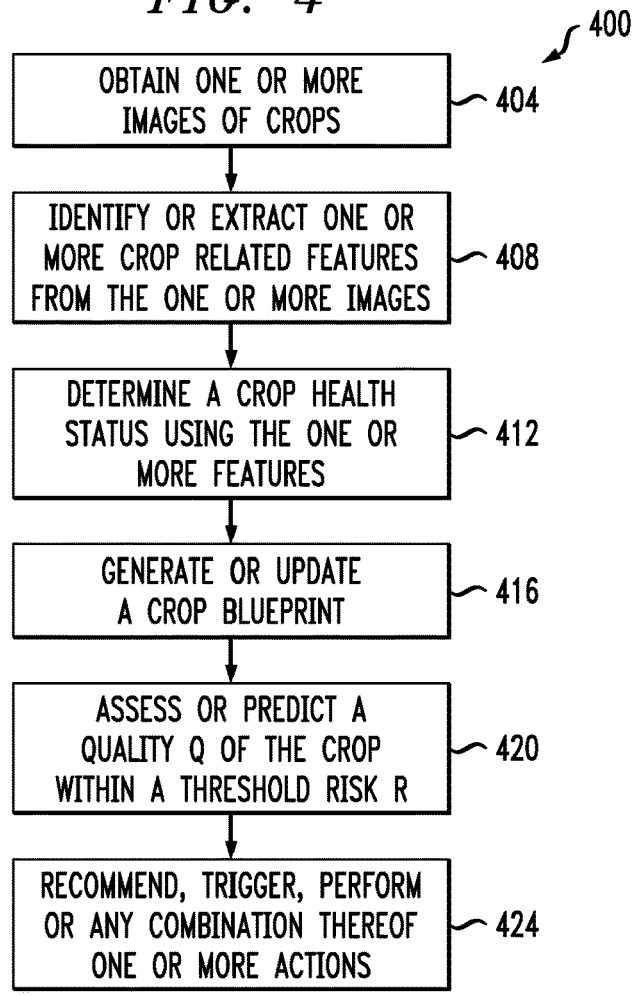
FIG. 4 is a flowchart of an example method for generating or updating a crop blueprint, in accordance with an example embodiment.

FIG. 4 is a flowchart of an example method 400 for generating or updating a crop blueprint, in accordance with an example embodiment. The method 400 is also capable of recommending, triggering, performing, or any combination thereof one or more actions. In one example embodiment, the method 400 is performed by the system 300.

Initially, one or more photographic images of crops are obtained (operation 404). In one example embodiment, operation 404 is performed at regular time intervals, at a regular interval of the crop growth stages, in a continuous manner, and the like. The images may be obtained from a mobile phone/device, a fixed camera/sensor, a flying drone, a satellite, and the like.

One or more crop related features are identified or extracted from the one or more images (operation 408). For example, hyper-spectral imaging may be used to detect early blight conditions. In one example embodiment, low magnification images of an entire field are processed and various metadata extraction tools and analytics algorithms are applied. The metadata extraction tools can, for example, extract or detect an identity of the part or location of the farm where the image was taken. In another embodiment, high magnification images of the crops for a portion of the field may be used to detect insects.

A crop health status is determined using the one or more features, an environmental context, and a farm cohort (operation 412). The crop health status may be based on crop features, crop stress levels, environmental context (such as weather), number and types of insects, crop knowledge graph models, and the like. The environmental context is, for example, the local weather, a location of the crops, and the like.

A crop blueprint is generated or updated (operation 416). In one example embodiment, a crop blueprint is generated or inferred based on data from a crop database. The blueprint includes, for example, computed values such as the health of the crop, the assessed growth stage of the crop, implications of the environment on the health of the crop, and the like.

In one example embodiment, the quality Q of the crops within a threshold risk R (such as Q is less than the expected quality Q(s) for the growth stages (S) is assessed or predicted (operation 420). In one example embodiment, the quality assessment or prediction is performed by training a machine learning model using historical data. The historical data may be collected from, for example, a quality metric over a period of time that is determined by a human.

In one example embodiment, one or more actions are recommended, triggered, performed, or any combination thereof (operation 424). The action may be triggered by a condition, such as the health or quality of the crop in relation to an expected health or quality level L for the current stage of crop growth. The actions include, but are not limited to, notifying one or more human assessors of the crop status based on the estimation or prediction, informing the farmer of critical production risks, supporting farmer differentiation, providing a crop rating at harvest time, recommending harvesting of the crops early, recommending a switch to a different crop for the following growing season, recommending the application of chemicals (such as pesticides, herbicides, insecticides, fungicides, and the like), recommending obtaining and ingesting more photographic images of crops, recommending to harvest the crop (such as based on market readiness information, predicted weather forecast, and the like), triggering an irrigation system, sending a notification to a human expert (such as an agronomist, extension field officer, so-called "Mechanical Turk," and the like), sending an alert (such as via SMS, voice over IP messaging, multi-purpose messaging, social media platforms, and the like; and such as alerting farmers of a community based on the type and risk of a detected event), recommending a delay of the ripening period based on market conditions and other contextual information (such as, if the market is flooded with tomatoes and prices are low, recommending depriving the tomatoes of water for a few days until market conditions improve), and the like. The actions are based, for example, on the local weather, plant status, human evaluators, farmer profile, and the like. In one example embodiment, an action is recommended using a stored knowledge base, historic events of the crop, and the like.

In one example embodiment, the features extracted from the photographic images include, but are not limited to, a particular shape of the crop; a crop color and a rate of change of crop color; visual spots and spot patterns on the crop; an identification, an assessment, a characterization, or any combination thereof of an insect infesting the crop; an identification, an assessment, a characterization, or any combination thereof of a virus contracted by the crop; a pattern of worms/insects infesting a crop; an identification on how worms/insects are spreading to other plants on the farm over time; a condition of soil; and the like. The soil condition is recognized, for example, by observing a slower maturing rate (than the average maturing rate) of a crop at a particular location on the farm. In one example embodiment, the images are obtained via a high quality camera and hyper-spectral imaging is used for early blight detection. In another example embodiment, the photographic images are obtained by a camera that can take images at low magnification, high magnification, or both.

In one example embodiment, the features extracted in operation 408 are augmented with features and farm conditions that are visually or otherwise observed and submitted to the system by a user via a user interface. The observations are, for example, the rate of change of leaf color, particular insects on crop leaves, context information (such as a time of the day, and a type/name/number or characteristic of the insect), and the like.

Figure 5:
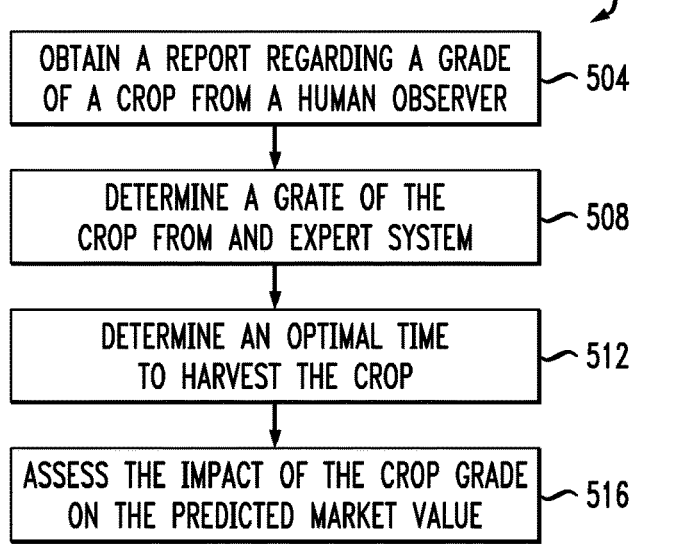
FIG. 5 is a flowchart of an example method for determining or predicting a grade of a crop, in accordance with an example embodiment.

FIG. 5 is a flowchart of an example method 500 for determining or predicting a grade of a crop, in accordance with an example embodiment. The rating (grade) can be used to inform the farmer of critical production risks, to support farmer differentiation, and the like. In some instances, with the informed consent of the farmer, a banker or other party with a legitimate interest in the farm may be provided with access to the data to influence the decision on harvesting, to gain confidence in the farmer for purposes of extending credit, and the like. In one example embodiment, a report regarding a grade of a crop is obtained from a human observer (operation 504). The determination of crop grading may be performed, for example, by a human expert (such as an agronomist). In one example embodiment, the determination of crop grading is performed via collaboration with human reporters connected via a telecommunications network. The grading (quality) rating is based on an understanding of weather, soil fertility, farm management practices, a comparison to a crop without imperfections, and the like. In one example embodiment, the report is generated by providing a video stream to a remote professional for expert evaluation of the crop. In another example embodiment, the report is generated by providing a series of static photographic images to a remote professional for expert evaluation of the crop.

In one example embodiment, an expert system determines a crop grading (operation 508). For example, learning methods, such as deep learning and neural networks, can be applied to generate an automated growth stage analysis. The learning methods can be applied with a confidence level (L). If the L is less than a certain specified threshold value, appropriate actions will be taken. For example, the meaning of the rate change of color changes may be learned based on historical images and based on the data from the crop knowledge graph. The threshold value can be learned over a period of time using historical threshold values. In one example embodiment, the automated growth stage analysis uses context information, such as weather and the like. In one example embodiment, databases of neighboring farms or farms having similar characteristics, similar contextual information, and the like are used to determine the rating of the crop.

In one example embodiment, the expert system determines a crop rating by, for example, analyzing photographic images of the crops, analyzing weather conditions, and the like. For example, low magnification images of an entire field can be processed by various metadata extraction tools and analytics algorithms. The metadata extraction tools can, for example, extract or detect the identity of the part or location of the farm where the image was taken. In another embodiment, high magnification photographic images can be used to determine the type and number of insects.

In one example embodiment, the optimal time to harvest a crop is determined (operation 512). For example, learning algorithms, visual analytics, and databases of neighboring farms or farms having similar characteristics, similar contextual information, and the like can be used to determine the optimal time to harvest a crop. The similarity may be based on a water sensitivity score, farmer reliability, a water point reliability, and the like.

In one example embodiment, the optimal time to harvest the crop is determined based on a time-series evaluation. The knowledge base (represented using ontology and searchable graphs) may be used to provide ground evidence of the crop growth state. In one example embodiment, the knowledge base hierarchically characterizes and organizes a crop based on crop type, crop size, calyx characteristics, color development, fruit ripening, and the like.

In one example embodiment, the impact of crop grading on the predicted market value of the crop is assessed (operation 516). This is based, for example, on historical market data for graded crops, cohort of crops, or both.

In one example embodiment, the analysis of method 500 considers the planting history of the farm, a water uptake history of the farm over the last N days, past farmer activities, and the like. The analysis may further incorporate soil pH variation or evolution (between, for example, a current time Tc and an aggregated past time Tp), farmer history, and farm history.

Given the discussion thus far, it will be appreciated that, in general terms, an exemplary method, according to an aspect of the invention, includes the operations of obtaining one or more images of crops 404; at least one of identifying or extracting 308, 312 one or more crop related features from the one or more images 408; determining 316 a crop health status based on the one or more crop related features, an environmental context, a growth stage of the crop, and a farm cohort by using a computerized deep learning system to perform an automated growth stage analysis 412; and at least one of recommending 336, triggering, and performing one or more actions 424.

In one example embodiment, the operations further comprise assessing or predicting a quality Q of the crops within a threshold risk R 316, 420. In one example embodiment, the operations further comprise generating or updating 332 a crop blueprint 390, 416. In one example embodiment, the operations further comprise augmenting the crop related features with farm conditions that are observed and submitted by a user 340, 504 via a user interface. In one example embodiment, the operations further comprise analyzing 312 the one or more images of crops to detect an identity of a location of a farm corresponding to one of the one or more images. In one example embodiment, the operations further comprise performing hyper-spectral imaging to recognize early blight conditions.

In one example embodiment, the crop health status is based on one or more of the crop related features, crop stress levels, environmental context, and crop knowledge graph models 380. In one example embodiment, the one or more images of crops are obtained from a mobile phone, mobile, device, a camera, a sensor, a sensing device mounted on a farm vehicle, a flying drone, or a satellite. In one example embodiment, the recommending, triggering, or performing the one or more actions is triggered by a health or quality of the crop in relation to an expected level L for a current stage of crop growth. In one example embodiment, the actions are one or more of notifying one or more human assessors 336 of a crop status based on the crop health status, informing 336 a farmer of critical production risks, supporting farmer differentiation, providing a crop rating at harvest time, recommending 336 harvesting of the crops early, recommending 336 a switch to a different crop for a following growing season, recommending 336 application of chemicals or fertilizers, recommending 336 obtaining and ingesting more crop images, recommending to harvest the crop, triggering an irrigation system, sending a notification 336 to a human expert, sending an alert 336, and recommending 336 a delay of a ripening period based on market conditions and other contextual information. In one or more embodiments, further steps include actually carrying out one or more recommended actions; e.g., harvesting the crops early, switching to the different crop for the following growing season, applying the chemicals or fertilizers, harvesting the crop, and irrigating with the irrigation system. In some cases, actions can be controlled or triggered via network adapter 20 and/or I/O interfaces 22 discussed elsewhere herein.

In one example embodiment, an action is recommended using a stored knowledge base and historic events 344 of the crop. In one example embodiment, the crop related features are one or more of a particular shape of the crop; a rate of change of crop color; spots and spot patterns on the crop; an identification, an assessment, a characterization, or any combination thereof of an insect infesting the crop; an identification, an assessment, a characterization, or any combination thereof of a virus contracted by the crop; a pattern of worms/insects infesting the crop; an identification on how worms or insects are spreading to other plants in a farm over time; and a condition of soil. In one example embodiment, the one or more images of crops are photographic images at different levels of magnification.

In one example embodiment, a system for determining or predicting a grade of a crop comprises a memory 28; and at least one processor 16, coupled to the memory, and operative to obtain a report regarding a first grade of a crop from a user 504; determine a second grade of the crop from an expert system 508 using deep learning to analyze weather conditions and one or more images of the crop; determine an optimal time to harvest the crop 512; and assess an impact of the crop grading on a predicted market value of the crop 516.

In one example embodiment, a non-transitory computer readable medium comprising computer executable instructions which when executed by a computer cause the computer to perform the method of obtaining one or more images of crops 404; at least one of identifying or extracting 308 one or more crop related features from the one or more images 408; determining 316 a crop health status based on the one or more crop related features, an environmental context, a growth stage of the crop, and a farm cohort using deep learning to perform an automated growth stage analysis 412; and at least one of recommending 336, triggering, and performing one or more actions 424.

Figure 6:
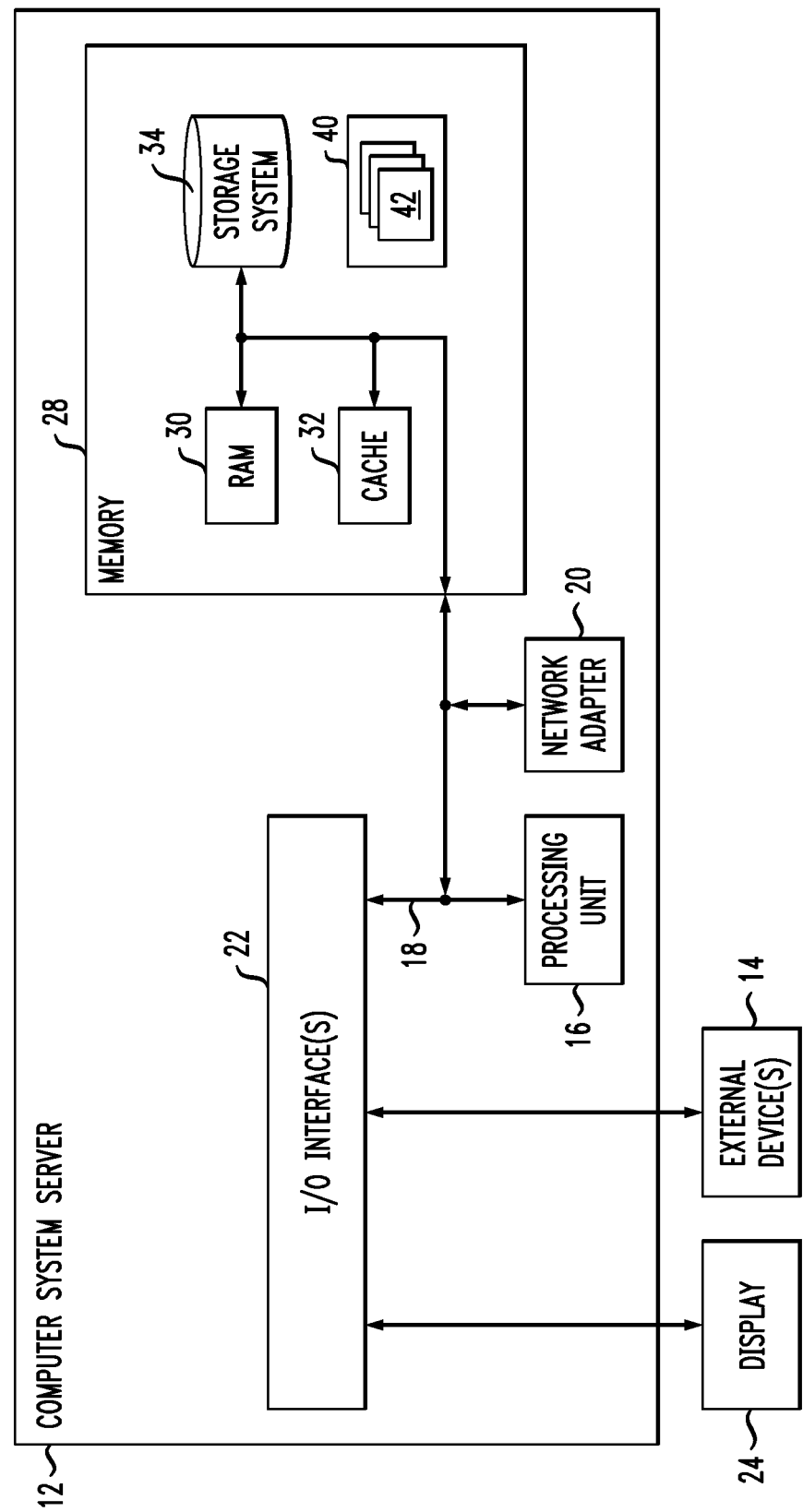
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating or updating a crop blueprint, the method comprising:
   obtaining one or more images of crops;
   extracting one or more crop related features from the one or more images;
   determining a crop health status based on the one or more crop related features, an environmental context, a growth stage of the crop, and a farm cohort by using a computerized deep learning system to perform an automated growth stage analysis;
   predicting a quality of the crops within a threshold risk R based on the one or more crop related features, the threshold risk R being based on a comparison of the predicted quality and an expected quality for a corresponding growth stage; and
   at least one of recommending, triggering, and performing one or more actions;
   wherein the obtaining one or more images of crops is repeated at a frequency based on a rate of change of leaf color and wherein the extracting one or more crop related features from the one or more images is based on one or more machine learning methods that use deep learning to learn a meaning of a rate of change of crop color based on historical images and based on data from a crop knowledge graph.

2. The method of claim 1, further comprising generating or updating a crop blueprint.

3. The method of claim 1, further comprising augmenting the crop related features with farm conditions that are observed and submitted by a user via a user interface.

4. The method of claim 1, further comprising analyzing the one or more images of crops to detect an identity of a location of a farm corresponding to one of the one or more images.

5. The method of claim 1, further comprising performing hyper-spectral imaging to recognize early blight conditions.

6. The method of claim 1, wherein the crop health status is further based on one or more of crop stress levels and crop knowledge graph models.

7. The method of claim 1, wherein the one or more images of crops are obtained from a mobile phone, mobile, device, a camera, a sensor, a sensing device mounted on a farm vehicle, a flying drone, or a satellite.

8. The method of claim 1, wherein the recommending, triggering, or performing the one or more actions is triggered by a health of the crop or the quality of the crop in relation to an expected level L for a current stage of crop growth.

9. The method of claim 1, wherein the actions are one or more of notifying one or more human assessors of a crop status based on the crop health status, informing a farmer of critical production risks, supporting farmer differentiation, providing a crop rating at harvest time, recommending harvesting of the crops early, recommending a switch to a different crop for a following growing season, recommending application of chemicals or fertilizers, recommending obtaining and ingesting more crop images, recommending to harvest the crop, triggering an irrigation system, sending a notification to a human expert, sending an alert, and recommending a delay of a ripening period based on market conditions and other contextual information.

10. The method of claim 1, wherein an action is recommended using a stored knowledge base and historic events of the crop.

11. The method of claim 1, wherein the crop related features are one or more of a particular shape of the crop; a rate of change of crop color; spots and spot patterns on the crop; an identification, an assessment, a characterization, or any combination thereof of an insect infesting the crop; an identification, an assessment, a characterization, or any combination thereof of a virus contracted by the crop; a pattern of worms/insects infesting the crop; an identification on how worms or insects are spreading to other plants in a farm over time; and a condition of soil.

12. The method of claim 1, wherein the one or more images of crops are photographic images at different levels of magnification.

13. A non-transitory computer readable medium comprising computer executable instructions which when executed by a computer cause the computer to perform the method of:
   obtaining one or more images of crops;
   extracting one or more crop related features from the one or more images;
   determining a crop health status based on the one or more crop related features, an environmental context, a growth stage of the crop, and a farm cohort using deep learning to perform an automated growth stage analysis;
   predicting a quality of the crops within a threshold risk R based on the one or more crop related features, the threshold risk R being based on a comparison of the predicted quality and an expected quality for a corresponding growth stage; and
   at least one of recommending, triggering, and performing one or more actions;
   wherein the obtaining one or more images of crops is repeated at a frequency based on a rate of change of leaf color and wherein the extracting one or more crop related features from the one or more images is based on one or more machine learning methods that use deep learning to learn a meaning of a rate of change of crop color based on historical images and based on data from a crop knowledge graph.

* * * * *